Patented July 4, 1944

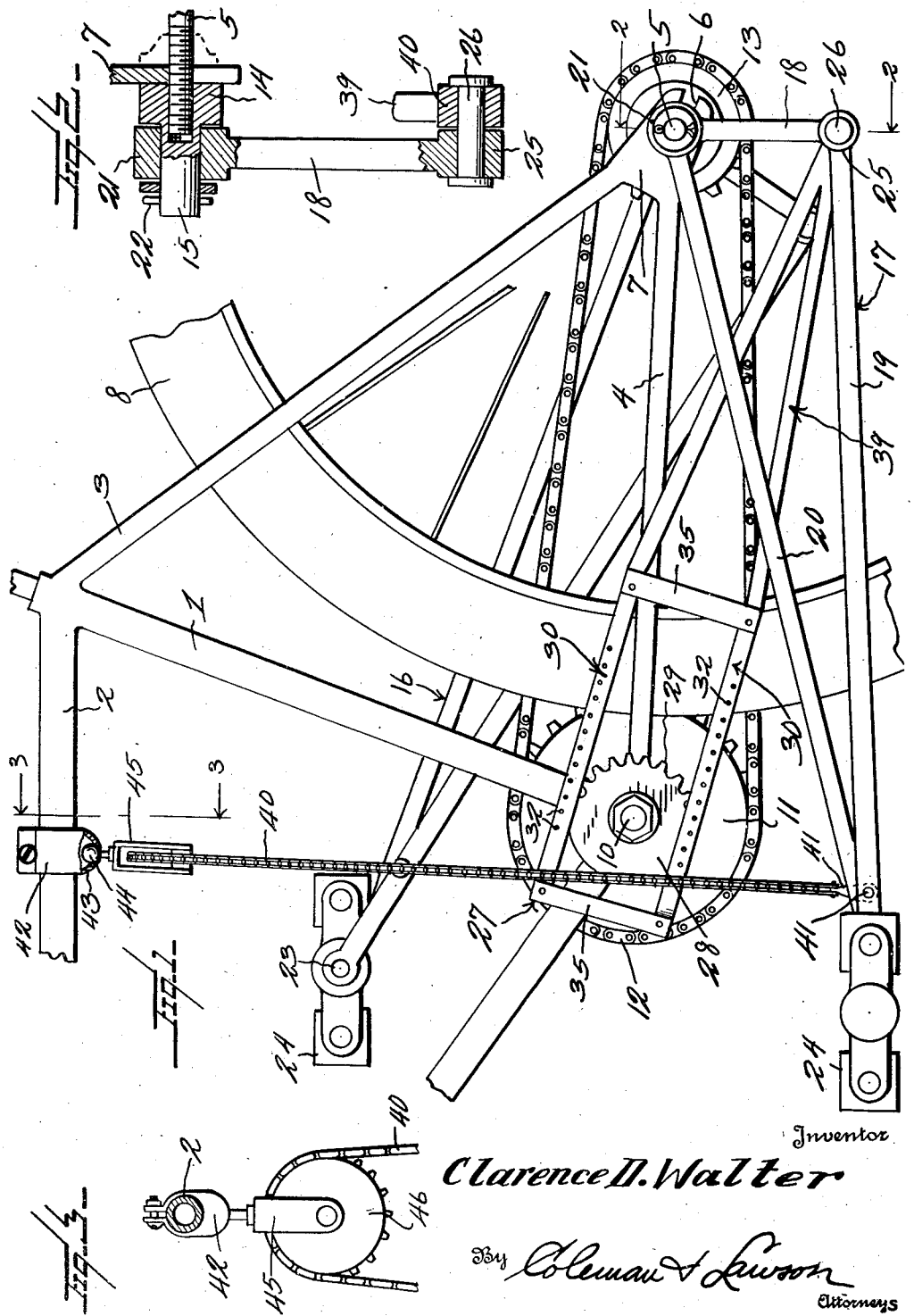

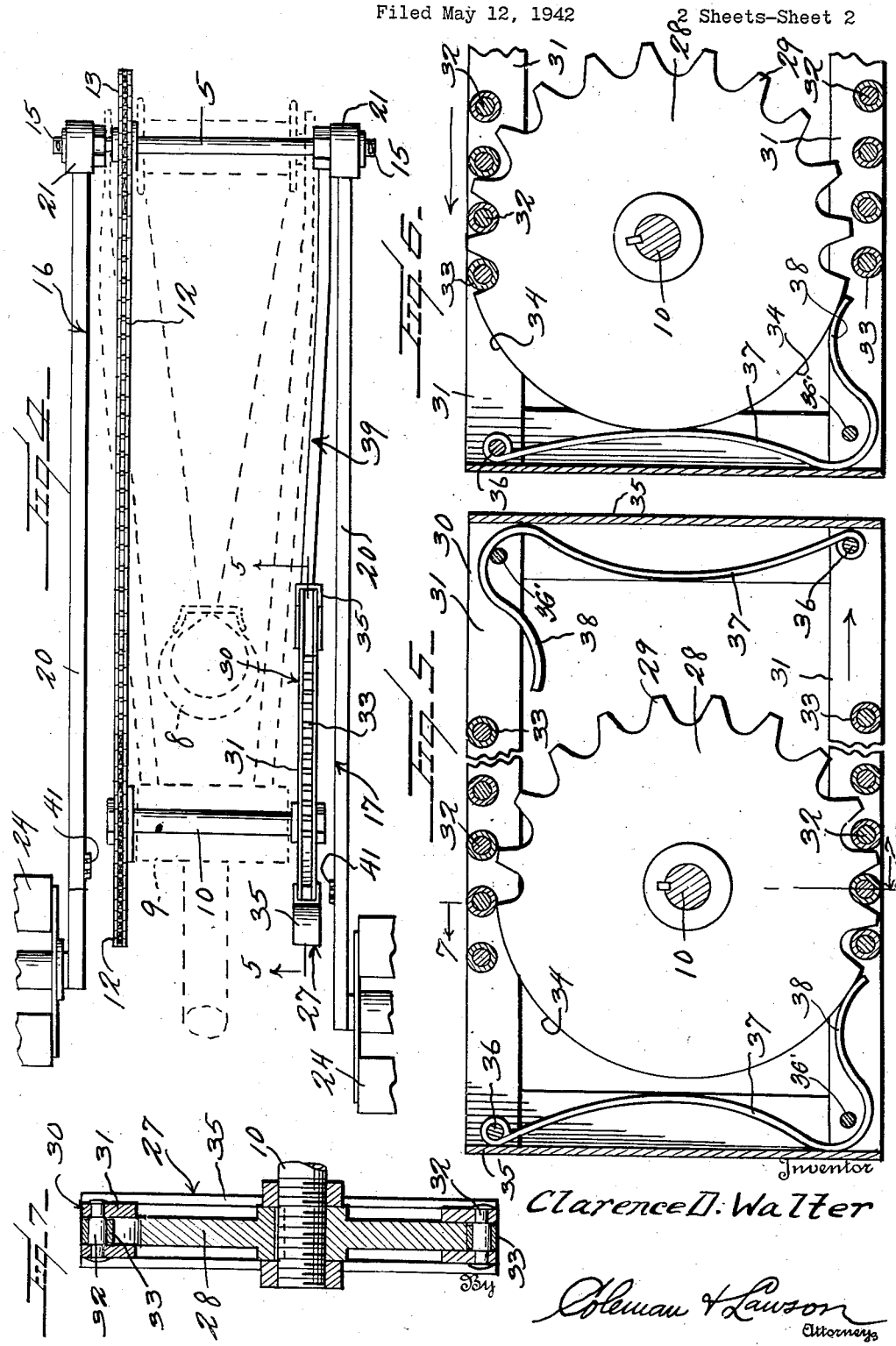

2,352,672

UNITED STATES PATENT OFFICE 2,352,672

BICYCLE PROPULSION MECHANISM

Clarence D. Walter, Milton, Oreg.

Application May 12, 1942, Serial No. 442,670

5 Claims. (Cl. 74—30)

This invention relates generally to the class of velocipedes, and pertains particularly to an improved propulsion mechanism designed for use particularly upon bicycles.

In the present construction of bicycle propulsion mechanism wherein the pedal cranks are attached directly to the shaft of the driving sprocket and such sprocket is connected by a driving chain with a rear wheel axle sprocket, the maximum driving effort is only obtained through approximately a ninety degree rotation of the pedal crank and after such extent of movement the power applied to the driving sprocket and to the driven rear wheel rapidly diminishes until the point is reached where the pedal crank has made a full one hundred and eighty degree rotation or, in other words, has moved from its highest position to its lowest position in the circle which it travels.

The principal object of the present invention is to provide a novel propulsion mechanism wherein the power delivered to the driving sprocket from each pedal is constant or uniform through the entire range of movement of the pedal crank from its uppermost to its lowermost position, with the result that a smoother driving action of the velocipede is obtained, and also, it is believed, a greater amount of power can be applied to the driven wheel axle for the effort expended by the rider, than is the case with the standard type of bicycle driving mechanism such as is above described.

Another object of the invention is to provide a novel rack and gear mechanism employing two spaced parallel racks forming a part of a frame and a mutilated gear operating between such racks, wherein the untoothed portion of the gear has sliding contact with one rack, while the toothed portion is in operative engagement with the opposite rack and the said untoothed portion and one rack cooperate to maintain the gear teeth and rollers or pins of the other rack in firm operative connection.

A still further object of the invention is to provide in a rack and gear mechanism of the above described construction, a novel means for effecting relative shifting motion of the gear and the two racks forming the frame in which the gear operates, when the two ends of the frame come into a prescribed relation.

A further object of the invention is to provide in a bicycle driving mechanism, a novel construction wherein both pedals may be employed for imparting driving motion to a single rack and gear set-up, the driving motion being transmitted from one pedal to the other and then to the rack through the medium of an interconnecting cable or chain.

The invention will be best understood from a consideration of the following detailed description taken in connection with the accompanying drawings, it being understood, however, that the invention is not to be considered as limited by the specific illustration or description but that such illustration and description constitute a preferred embodiment of the invention.

In the drawings:

Figure 1 is a view in side elevation of a portion of the rear of a bicycle showing the mechanism embodying the present invention set up in the structure.

Figure 2 is a sectional view taken substantially on the line 2—2 of Figure 1.

Figure 3 is a sectional view on the line 3—3 of Figure 1.

Figure 4 is a view in top plan of the essential portions of the present improved driving mechanism showing the connection of the same with the standard driving and driven sprockets, portions of the bicycle frame and rear wheel being shown in broken lines.

Figure 5 is a sectional view taken on the line 5—5 of Figure 4, the middle portion of the rack frame being broken away and the frame shortened to show the shifting springs in the ends thereof.

Figure 6 is a sectional view of one end, the section being at right angles to the driving sprocket axle, illustrating the action of the shift spring in moving the rack frame relative to the mutilated gear to transfer the driving action from one rack to the other.

Figure 7 is a sectional view taken substantially on the line 7—7 of Figure 5.

Referring now more particularly to the drawings, the numeral 1 designates the seat or saddle post of a bicycle which, at its upper end, connects with the horizontal forwardly extending frame bar 2 and with the rearwardly and downwardly extending fork 3, the end portions of which connect in the usual manner with the corresponding end portions of the horizontal fork 4.

The numeral 5 designates the rear axle of the bicycle which has its ends disposed in the slots 6 of the connecting plates 7 which join the adjacent portions of the forks 3 and 4. A portion of the rear wheel is indicated at 8.

In Figure 4 there is illustrated in broken lines the hub or bearing which is integrally connected with the lower end of the saddle post 1 and through which extends the main driving sprocket axle 10 upon one end of which the sprocket 11 is mounted. This driving sprocket is connected by the usual sprocket chain 12 with the smaller rear and driven sprocket wheel 13 which is mounted upon the shaft 5.

In accordance with the present invention, the usual securing nuts, not shown, which are threaded upon the ends of the rear wheel axle are removed and replaced by the trunnion nuts 14 with each of which is integrally connected the short trunnion or stub shaft 15.

The numerals 16 and 17 designate pedal cranks or levers, each of which is in the form of an elongated triangle and is preferably formed of tubular material. The three sides of each triangular lever are designated 18 for the side, 19 for the elongated base, and 20 for the hypotenuse portion which connects the ends of the base and side. At the angle or point of connection between the side and hypotenuse 20 of each lever there is formed a bearing 21 which receives a trunnion 15 so that the side 18 of each lever hangs or is suspended from the trunnion. At the opposite end of each lever there is secured a laterally extending spindle 23 upon which is rotatably mounted in the usual manner a pedal 24 which may be of any desired design.

The lower end of the side 18 of lever 17 is also formed to provide a bearing 25 in which is mounted an end of a pivot pin 26. With this pin is connected, in the manner hereinafter described, the reciprocating rack frame which is indicated generally by the numeral 27.

The rack frame 27 is disposed upon the opposite side of the bicycle frame from the driving ratchet wheel 11 and is operatively coupled with a mutilated sprocket wheel 28 which is mounted upon and secured to the sprocket shaft 10. This mutilated sprocket gear or wheel is provided with the sprocket teeth 29 around a little over half its circumference, as clearly shown in Figures 5 and 6, the remaining portion of the periphery being unbroken and having a radius equal to the radius of the wheel or gear to the points of the teeth.

The rack frame is made up of the two spaced parallel rack units, each of which is indicated by the reference character 30. These racks or rack units comprise the spaced parallel bars 31 between which are secured the sprocket roller pins 32 each of which carries a sprocket roller 33 which additionally functions as an abutment for the untoothed or unmutilated portion of the gear 28. Such untoothed or unmutilated peripheral portion is indicated by the numeral 34.

The adjacent ends of the rack units 30 are connected by the transverse channel bars 35.

The rack units 30 and the transverse channel bars 35 are coupled together by suitable transversely extending pins or bolts at the corners of the frame and the bolts or pins at two oblique corners are indicated by the reference numeral 36, while the corresponding pins of the opposite corners are indicated by the reference numeral 36'. To each of the pins 36 is attached an end of a bowed ribbon spring 37 which lies in the adjacent channel bar, the bow extending inwardly from the bottom of the channel toward the transverse center of the frame to oppose the gear 28 which is disposed, as shown in Figures 5 and 6, with its periphery between the bars 31 of the two racks. The adjacent end of the main sprocket shaft 10, of course, extends through the rack frame in order to support the gear 28 therein.

Each of the springs 37 has its opposite end free and is reverted to form the inwardly extending finger 38 which, at its terminus, lies well within the space between the adjacent edges of the bars of the opposing racks. The reverted ends of the springs pass behind the pins 36' and are thus prevented by these pins from moving from operative position. Each such finger is also relatively close to the end of the adjacent line of sprocket rollers and, of course, the fingers are upon opposite sides of the rack frame and at opposite ends so that each cooperates with one row of sprocket rollers and functions to shift the rack frame in a plane perpendicular to the shaft 10.

As previously stated, the periphery of the mutilated sprocket gear is constantly engaged at diametrically opposite portions between the two spaced bars 31 of the racks, and also certain of the teeth are constantly engaged between the sprocket rollers of one rack, while the untoothed periphery 34 is constantly in contact with or engaged against the sprocket rollers of the opposing rack.

At one end the sprocket frame is integrally connected with a coupling arm 39 which has, at the end remote from the rack frame, the bearing 40 through which extends the pivot pin 26 whereby the rack is operatively coupled with the bearing 25 of the pedal lever 17. Oscillation of the lever 17 will, therefore, impart backward and forward motion to the rack frame 27 to actuate the mutilated sprocket gear 28 in the manner hereinafter stated.

While there may be employed, if desired, a rack frame and mutilated gear driving unit on each side of the bicycle, satisfactory operation may be obtained by the use of a single unit of this type. Where use of the single unit is made the pedal levers will be coupled together so that power may be transmitted from each to the rack frame. Such a coupling is shown in Figure 1.

The connection or coupling between the pedal levers comprises a sprocket chain 40 which is pivotally connected, as at 41, at each of its ends, to the forward end of a pedal lever.

Upon the frame bar 2 there is secured a clamp 42, the lower portion of which is suitably formed to provide a socket 43 in which is located a head or ball 44 which is attached to a pulley sheave 45. This sheave pivotally supports a toothed pulley or sprocket wheel 46 over which the coupling chain 40 passes. While a sprocket chain and sprocket wheel have been shown in the mechanism operatively coupling the forward ends of the pedal levers, it will be readily understood that a pulley and cable may be employed if desired to effect the transmission of motion from the lever 16 to the lever 17 so that such motion may be further transmitted to the rack frame 27.

In the operation of the present power transmission it will be seen that if, at the start of the operation of the bicycle, the pedals are in the position shown in Figure 1, power will first be transmitted through the right lever 16 to the chain 40. This will cause the left lever to be swung at its forward end and thereby transmit forward movement to the rack frame. When such movement occurs the teeth of the mutilated gear will be in connection with the sprocket rollers of the top rack, as shown in Figure 6, and, consequently, as the rack moves forwardly the mutilated gear will be turned and the untoothed or smooth peripheral portion 44 will slide over the rollers of the lower rack.

Figure 5 illustrates the relative positions of the racks and the mutilated gear as the rack frame moves rearwardly and approaches the limit of its rearward stroke. It will be seen that the teeth are approaching the end of the lower rack and the untoothed portion of the gear has just come into contact with the finger 38 of the adjacent spring. Further movement of the rack frame to the rear, in the direction indicated by the arrow, will bring the bowed portion of the spring into contact with the gear. The spring will thus be flexed both at the bowed portion and at the finger 38 and as the untoothed portion of the gear passes off of the last roller of the upper rack the tensioned spring will cause the rack to shift downwardly, the rollers of the upper rack dropping into the spaces between the gear teeth and the untoothed portion of the gear riding onto the first one of the rollers of the lower rack. This occurs when the operating lever, which would be the lever 17, reaches the limit of its downward movement and the right lever reaches the limit of its upward movement and is ready to move down. Downward pressure is then applied to the pedal of the right lever 16, which causes the direction of movement of the rack frame to change or reverse, the frame then starting to move forward and the mutilated gear and racks being in the relation shown in Figure 6. This action is repeated as the rear end of the frame approaches the mutilated gear, the rear spring 37 then causing the frame to rise or be lifted so that the change of connection between the mutilated gear teeth and the racks may take place.

From the foregoing it will be readily apparent that with driving mechanism such as is here set forth, a smooth continuous application of power to the rear wheel axle through the medium of the shaft 10, sprocket wheel 11, chain 12, and rear sprocket 13, may take place and that also a full application of power is made possible through the entire oscillating stroke of each pedal lever.

I claim:

1. In a bicycle having a rear wheel drive including a rear axle and a driving shaft operatively coupled with the axle, a propulsion mechanism comprising a pair of pedal levers supported for oscillation on the axis of said axle, a rack unit including two spaced parallel racks, means operatively coupling said unit with one lever adjacent the oscillation axis by which reciprocatory movement of the units is effected through the oscillation of said one lever, a mutilated gear carried by said shaft and disposed between and in the plane of said racks, said mutilated gear having teeth partway therearound and being smooth throughout the remainder of its periphery, the smooth portion of said gear being in contact with one rack while the teeth are in engagement with the opposite rack, means for shifting the rack unit in the plane of the gear at the limit of the stroke in each direction for the unit whereby to shift engagement of the gear teeth from one rack to the other, and means for transmitting power from the other lever to the said one lever.

2. A bicycle propulsion mechanism as set forth in claim 1, in which said racks are formed to provide opposing channels in which the periphery of the mutilated gear engages, the racks having sprocket rollers extending transversely thereof for engagement between the teeth of the gear, the said mutilated gear being of a diameter to facilitate the engagement of the smooth peripheral portion against the sprocket rollers of one rack while the teeth are in operative connection with the sprocket rollers of the opposite rack.

3. In a bicycle having a rear wheel axle, a power receiving shaft, and an operative driving coupling between the shaft and axle, a propulsion mechanism comprising a pair of elongated pedal levers each supported upon an end of the axle for oscillation on the axis thereof, one of said levers carrying a depending member terminating at its lower end in a bearing, a pair of racks disposed in spaced parallel relation and connected at their adjacent ends by transverse channel members forming an elongated frame, an operative coupling between one end of said frame and said bearing by which reciprocal movement of the frame is effected upon vertical oscillation of the said one lever, each of said racks comprising a pair of spaced members having a plurality of sprocket rollers supported therebetween, a mutilated gear operatively coupled with said shaft and having teeth formed around substantially half its periphery and the remainder of the periphery being smooth, said gear being disposed between the racks with its periphery slidably engaged in the channels formed by the parallel members thereof, the diameter of the gear being such that the smooth peripheral portion bears against the rollers of one rack while the teeth are in operative connection with the rollers of the opposite rack, spring means carried in the channel cross members of the frame which are so constructed and arranged that each, when engaged by the gear upon movement of the rack frame in one direction, will be compressed and reacts upon the movement of the smooth gear portion off of a rack to shift the rack frame for engagement of the gear teeth with the opposite rack, and means for transmitting power from the other pedal lever to the said one lever.

4. A bicycle propulsion mechanism as set forth in claim 3, in which each of said frame shifting springs comprises an elongated spring strip pivotally mounted at one end at an end of a rack and extending transversely of the frame in the plane of the gear and terminating at its other end in a reverted finger extending generally lengthwise of the frame between the end of the adjacent row of sprocket rollers and the adjacent frame end and extending into the space between the two racks in position for engagement with the periphery of the gear, each of said springs further being bowed between the finger and the pivoted end of the spring, the bow extending inwardly toward the gear periphery, the fingers of the springs being disposed adjacent diagonal corners of the frame.

5. A bicycle propulsion mechanism as set forth in claim 3, in which the said one of the levers is in the form of an elongated triangle extending lengthwise of the bicycle and in which said depending member constitutes the base side of said triangle, the said racks and operative coupling likewise extending lengthwise of the bicycle and downwardly for the stated connection of the coupling with the said bearing.

CLARENCE D. WALTER.